(12) United States Patent
Spindler et al.

(10) Patent No.: US 11,229,943 B2
(45) Date of Patent: Jan. 25, 2022

(54) SWITCH ARRANGEMENT FOR THE SELECTION OF JOINING ELEMENTS

(71) Applicant: EJOT GmbH & Co. KG, Bad Berleburg (DE)

(72) Inventors: Daniel Spindler, Friedrichroda (DE); Marco Mielisch, Erfurt (DE)

(73) Assignee: EJOT GmbH & Co., KG, Bad Berleburg (DE)

( * ) Notice: Subject to any disclaimer, the term of this patent is extended or adjusted under 35 U.S.C. 154(b) by 440 days.

(21) Appl. No.: 16/471,212

(22) PCT Filed: Dec. 19, 2017

(86) PCT No.: PCT/EP2017/083552
§ 371 (c)(1),
(2) Date: Jun. 19, 2019

(87) PCT Pub. No.: WO2018/114955
PCT Pub. Date: Jun. 28, 2018

(65) Prior Publication Data
US 2019/0374999 A1    Dec. 12, 2019

(30) Foreign Application Priority Data

Dec. 20, 2016 (DE) .................. 10 2016 125 041.4

(51) Int. Cl.
*B21J 15/32* (2006.01)
*B23P 19/00* (2006.01)
(Continued)

(52) U.S. Cl.
CPC ............. *B21J 15/32* (2013.01); *B23P 19/003* (2013.01); *B65G 47/1457* (2013.01);
(Continued)

(58) Field of Classification Search
CPC ................... B21J 15/32; B23P 19/003; B23P 19/004–005; B23P 19/006; B65G 29/00;
(Continued)

(56) References Cited

U.S. PATENT DOCUMENTS

| 4,673,078 A | 6/1987 | Swiatlowski et al. |
| 5,568,850 A | 10/1996 | Neber |

(Continued)

FOREIGN PATENT DOCUMENTS

| CN | 103978144 A | 8/2014 |
| CN | 203791560 U | 8/2014 |

(Continued)

OTHER PUBLICATIONS

Chinese First Office Action dated Nov. 24, 2020 in counterpart Chinese application 201780085584.9, 6 pages and Engloish translation, 4 pages.

(Continued)

*Primary Examiner* — Matthew P Travers
(74) *Attorney, Agent, or Firm* — Juan Carlos A. Marquez; Marquez IP Law Office, PLLC

(57) ABSTRACT

A switch arrangement for the selection of joining elements, which comprises a switch that comprises at least three supply points in which joining elements can be supplied to the switch in a position-oriented manner. Furthermore, an output point is provided where joining elements can be output in a position-oriented manner, the switch comprising a conveying element which has at least three receiving compartments each being adapted to receive a supplied joining element each at the supply point. A conveying element can convey the joining elements from a receiving position to an output position from the supply point to an output point, which is fixed relative to the supply points, and output.

13 Claims, 5 Drawing Sheets

Figure 1:
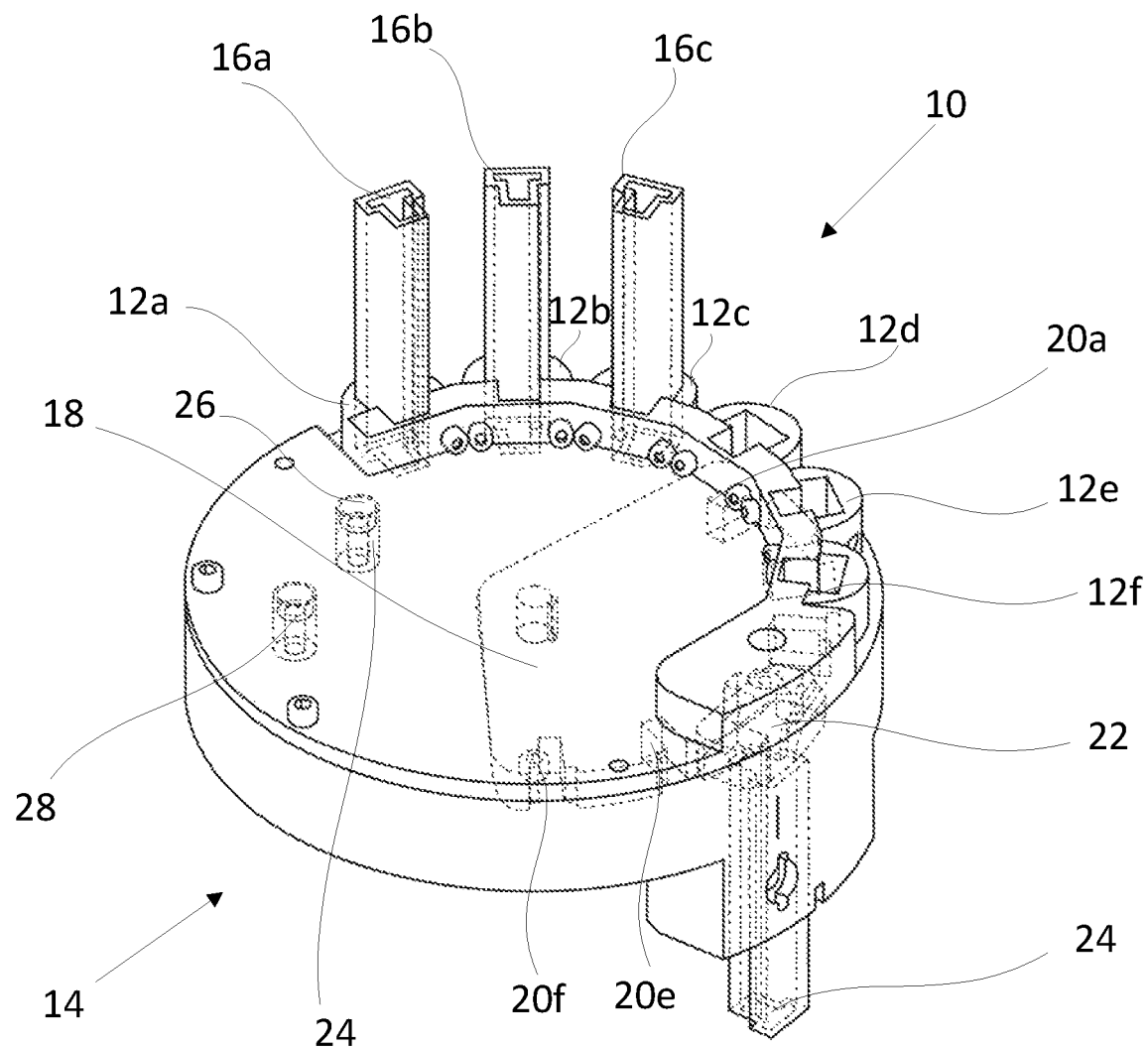

(51) Int. Cl.
  *B65G 47/14* (2006.01)
  *B65G 29/00* (2006.01)
  *B65G 47/29* (2006.01)
  *B65G 47/64* (2006.01)

(52) U.S. Cl.
  CPC ............ *B23P 19/005* (2013.01); *B65G 29/00* (2013.01); *B65G 47/29* (2013.01); *B65G 47/644* (2013.01)

(58) Field of Classification Search
  CPC .......................... B65G 47/08; B65G 47/1457; B65G 47/1492; B65G 47/29; B65G 47/30; B65G 47/32; B65G 47/644–648; B65G 47/681; B65G 47/80; B65G 47/846
  See application file for complete search history.

(56) References Cited

U.S. PATENT DOCUMENTS

| | | | |
|---|---|---|---|
| 5,590,459 | A | 1/1997 | Ohuchi et al. |
| 6,368,026 | B1 * | 4/2002 | Takazawa ............. B23P 19/001 406/110 |
| 10,052,142 | B2 | 8/2018 | Biedermann |
| 10,265,821 | B2 | 4/2019 | Deng et al. |

FOREIGN PATENT DOCUMENTS

| | | |
|---|---|---|
| CN | 104801963 A | 7/2015 |
| CN | 105012001 A | 11/2015 |
| CN | 105621071 A | 6/2016 |
| DE | 2847144 A1 | 5/1980 |
| DE | 3422838 A1 | 1/1985 |
| DE | 3226006 C2 | 1/1990 |
| DE | 9414323 U1 | 11/1994 |
| DE | 102004024762 A1 | 3/2005 |
| DE | 10358976 A1 | 7/2005 |
| DE | 102005015032 A1 | 10/2006 |
| DE | 102006057693 A1 | 6/2008 |
| FR | 2 662622 A1 | 12/1991 |
| GB | 2333517 A | 7/1999 |

OTHER PUBLICATIONS

International Search Report dated Apr. 3, 2018, issued in counterpart International Application No. PCT/EP2017/083552. (6 pages in German).

Written Opinion issued in counterpart International Application No. PCT/EP2017/083552. (5 pages in German).

German Search Report dated Dec. 8, 2017, issued in counterpart German Application No. 10 2016 125 041.4 (11 pages in German).

Chinese Second Office Action dated Jul. 8, 2021 in counterpart Chinese application 201780085584.9, 5 pages in Chinese and English translation, 4 pages.

International Preliminary Report on Patentability dated Jul. 4, 2019, issued in counterpart International Application No. PCT/EP2017/083552 (8 pages) in English.

* cited by examiner

SWITCH ARRANGEMENT FOR THE SELECTION OF JOINING ELEMENTS

The invention relates to a switch arrangement for the selection of joining elements according to the preamble of claim 1.

The switch arrangement according to the invention comprises a switch that has at least three supply points in which joining elements can be supplied to the switch in a position-oriented manner. In addition, an output point is provided at which joining elements can be output in a position-oriented manner. The switch comprises a conveying element which furthermore has at least three receiving compartments each of which is adapted to receive a respective joining element supplied to it at the supply point. By moving the conveying element from a receiving position to an output position, a joining element supplied as required can be moved from the supply point to the output point that is stationary relative to the supply point, and can be output there.

In the receiving position, all receiving compartments are aligned with their associated supply points, and the output position may be selected such that all receiving compartments have passed the output point before the conveying element reaches its output position.

If a joining element is conveyed from the supply point to the stationary output point, it can be ensured that only the conveying element and the joining element itself will actually have to be moved. The supply lines can thus be mounted in a largely motion-free manner. This improves the fatigue strength and reliability of such an arrangement.

In particular, a conveying drive is connected to the conveying element, enabling active operation of the conveying element.

In a preferred configuration, the conveying element can include a rotor element that can be rotated at least between certain areas. The joining elements can be conveyed by rotating or swiveling the rotor element.

The receiving compartments can preferably be in the form of openings in the conveying element, in particular in the rotor element, in which case said openings extend radially in the rotor element. Preferably, the joining elements are conveyed on a rolling surface located under the disc in the area of the openings, with said joining elements resting at least partially on the rolling surface.

In particular, the rolling surface has an opening in the area of the output point, whereby elements conveyed on the rolling surface can be output through the gap formed by the opening. Preferably, the joining elements can fall into a conveying tube or a manifold or the like that is connected downstream of the output point, before finally being supplied to the setting device.

Designing the output point in the form of an opening in the rolling surface will make it easy to output the joining elements using gravity only, without the need for any additional output mimic.

Preferably, a pulse of compressed air then conveys the joining element further and also supplies the joining element to the setting unit once it has exited the output point. Preferably, the pulse of compressed air can be introduced into the manifold. For this purpose, the switch can be provided with a compressed air connection in the manifold, downstream of the output point.

Furthermore, the switch arrangement can include a control unit, which can also be arranged in a higher-level control device, via which the switch communicates with a feeding device and the conveying drive, so that only one joining element can be output at a time in a defined manner.

In addition, a sensor can be provided downstream of the output point, said sensor detecting that a joining element has been output. Preferably, this signal is transmitted to the control unit which will then initiate the movement of the conveying element, in particular the rotation of the rotor element, into the receiving position. For this purpose, the control unit can control the rotor drive accordingly, thus causing the rotor element to be rotated back into its receiving position.

In its receiving position, the switch is then ready to pick up another joining element. The control unit will determine that the rotor element has reached its receiving position on the basis of the reset time, i.e. the time the rotor requires to return from the output position to the receiving position.

At the latest once the joining element has reached the receiving position, the control unit can output an output signal and initiate the feeding of a desired joining element to the respective supply point, which will cause a respective joining element to be transported via the conveyor line to the respective supply point.

A sensor for the detection of the joining element may be present in the transport path of the supply, which sensor will transmit the detection signal to a control unit. The sensor can be located at the output of a separating device and/or in the conveying line and/or at the supply point of the switch. The control unit can be set in such a way that the drive will begin to rotate the rotor element as a function of the detection. Depending on the position of the sensor, a delay for the detection can also be taken into account here.

It may be expedient to use a higher-level control device for controlling the switch because this will also allow other devices in a joining process to use the data for outputting and supplying the joining elements.

Preferably, the receiving compartments in the conveying element are of a T-shaped basic design, thus allowing joining elements having a head and a shaft to be safely conveyed therein in a correct positional orientation.

The shape of the receiving compartment assigned to a supply point can be adapted to the joining element conveyed there. This makes for a smooth transport of the joining element to the output point.

More specifically, the conveyor drive can be designed as an electric, electromechanical or pneumatic actuating drive. In particular, a pneumatic actuating drive may take the form of a swivel cylinder.

The rotor element can be designed as a disc or take the form of a plate comprising a circular sector.

The switch can include a stop for the rotor element. Said stop can be provided in the receiving position and/or also for the output position. In particular, the stop in the receiving position is selected such that all receiving compartments will be aligned with the receiving points. This will ensure that the joining elements are reliably supplied in the switch.

The stop at the output position is selected in such a way that all the receiving compartments will have passed through the output position before the stop acts on the rotor element. This will ensure that each compartment can be emptied reliably.

Using at least one stop will guarantee a reliable alignment at a high rate since precise position control is not necessary in the receiving position and/or in the output position.

In particular, one stop each can be provided in the receiving position and in the output position.

In an embodiment having a stop, the rotor element will not be rotated continuously but will be alternatingly rotated between the receiving position and the output position by a reversal of the direction of rotation. For this reason, it can also be driven by a swivel drive.

The stop means may take the form of a stop plate which interacts with a bolt guided in a slot in the stop plate. The bolts can then be attached to a rotor element in the form of a disc.

Furthermore, the conveying element can be designed in the form of a circular sector, and stop elements can be provided which act against the conveying element itself in both directions of rotation.

The receiving points are preferably designed in the form of a clamping rail to which conveying lines, especially in the form of T tubes, can be attached.

Figures 2A, 2B:
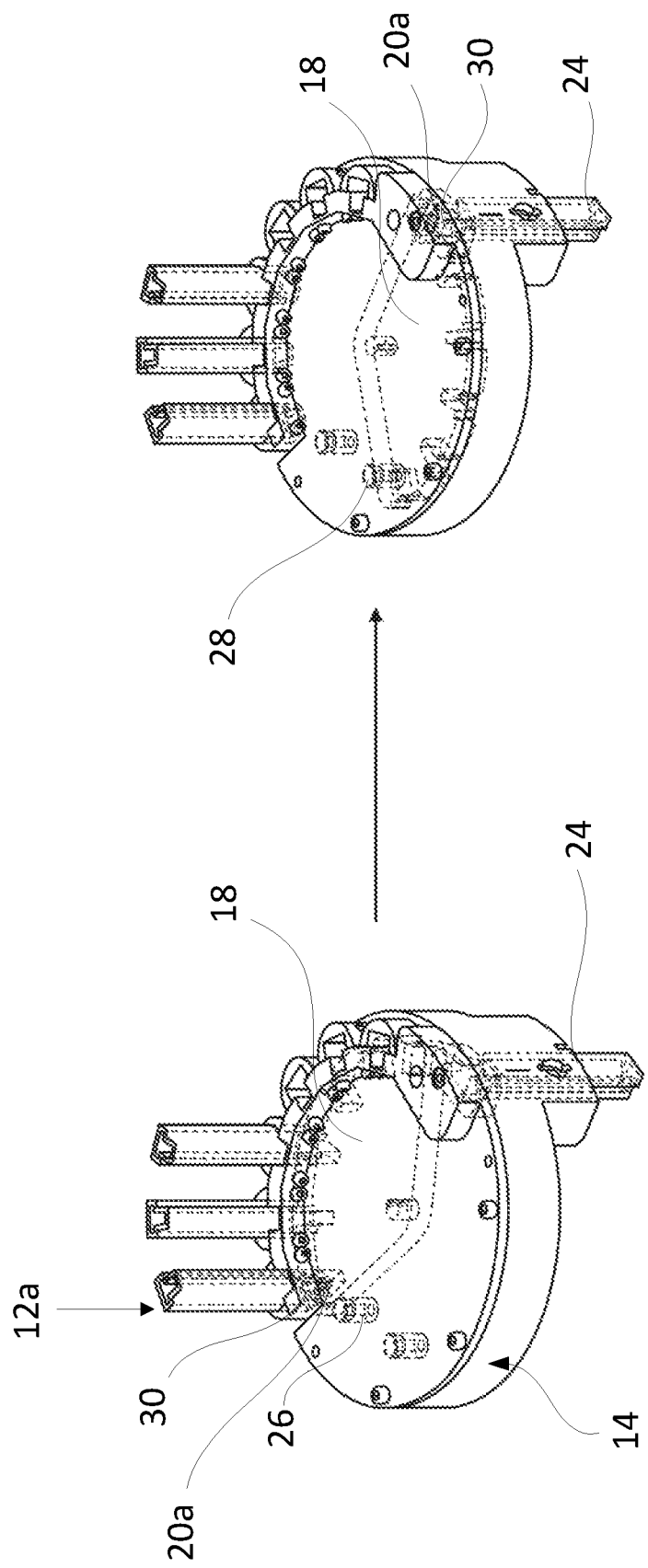
Figure 3:
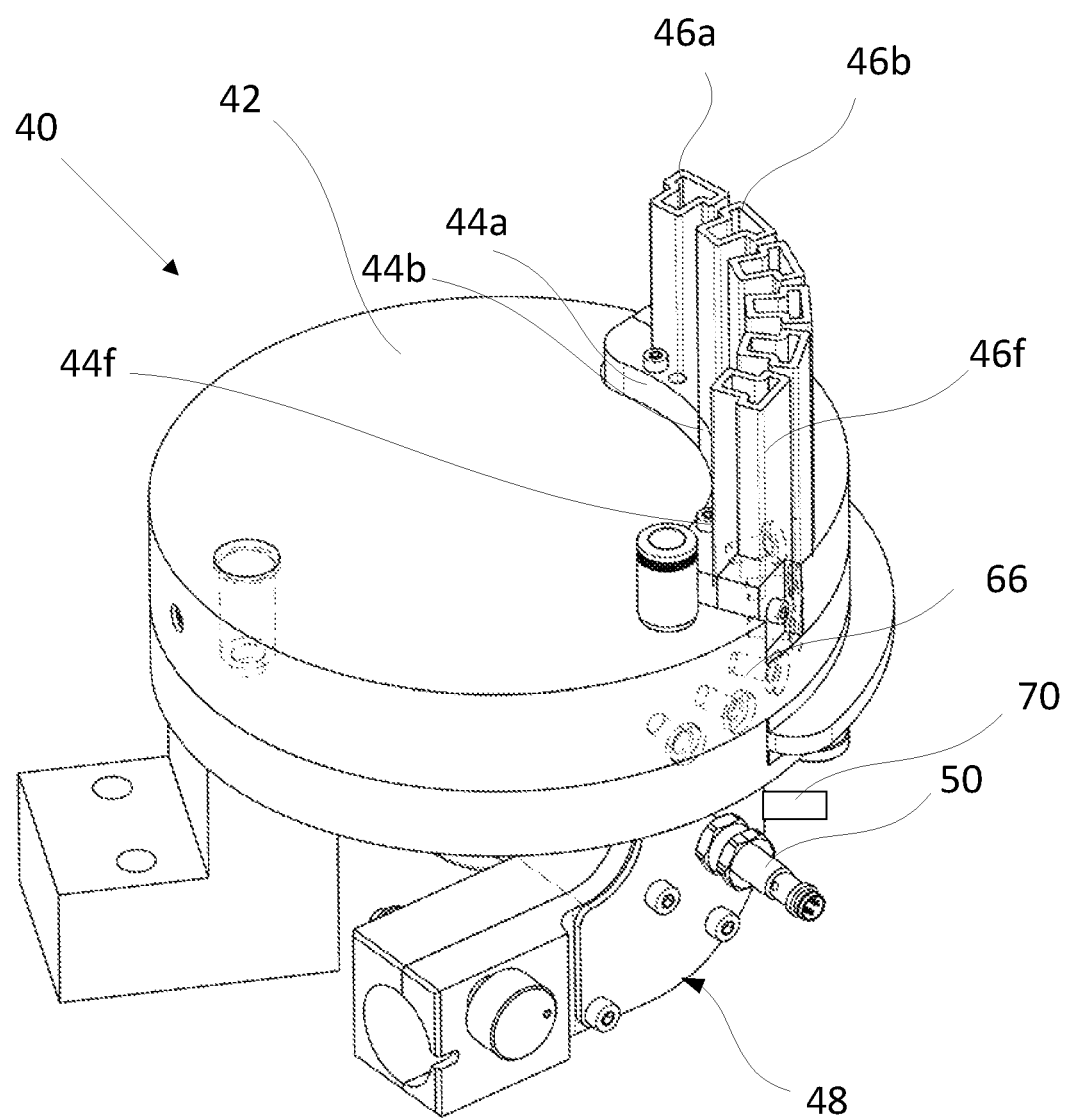
Figure 4:
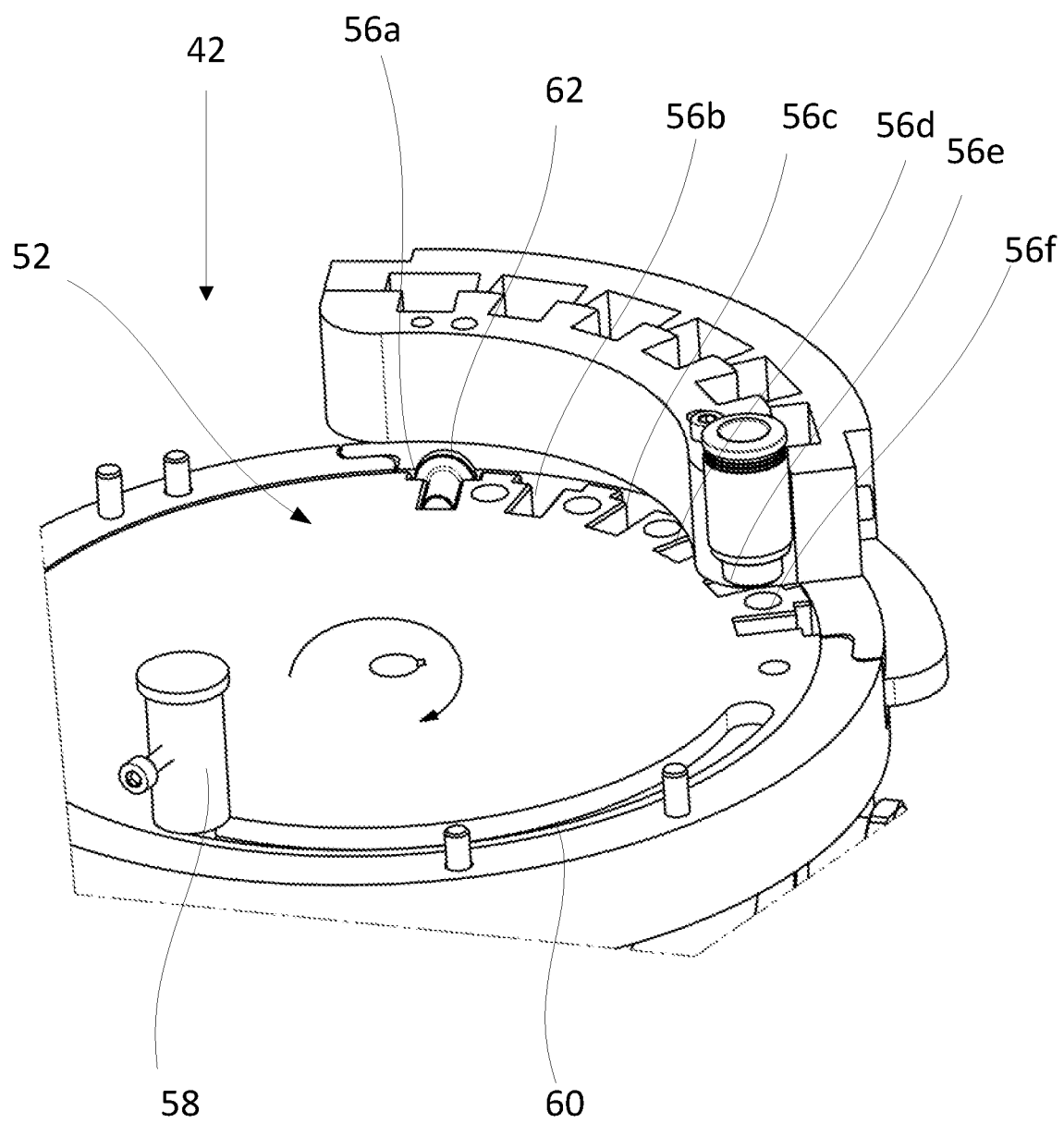
Figure 5:
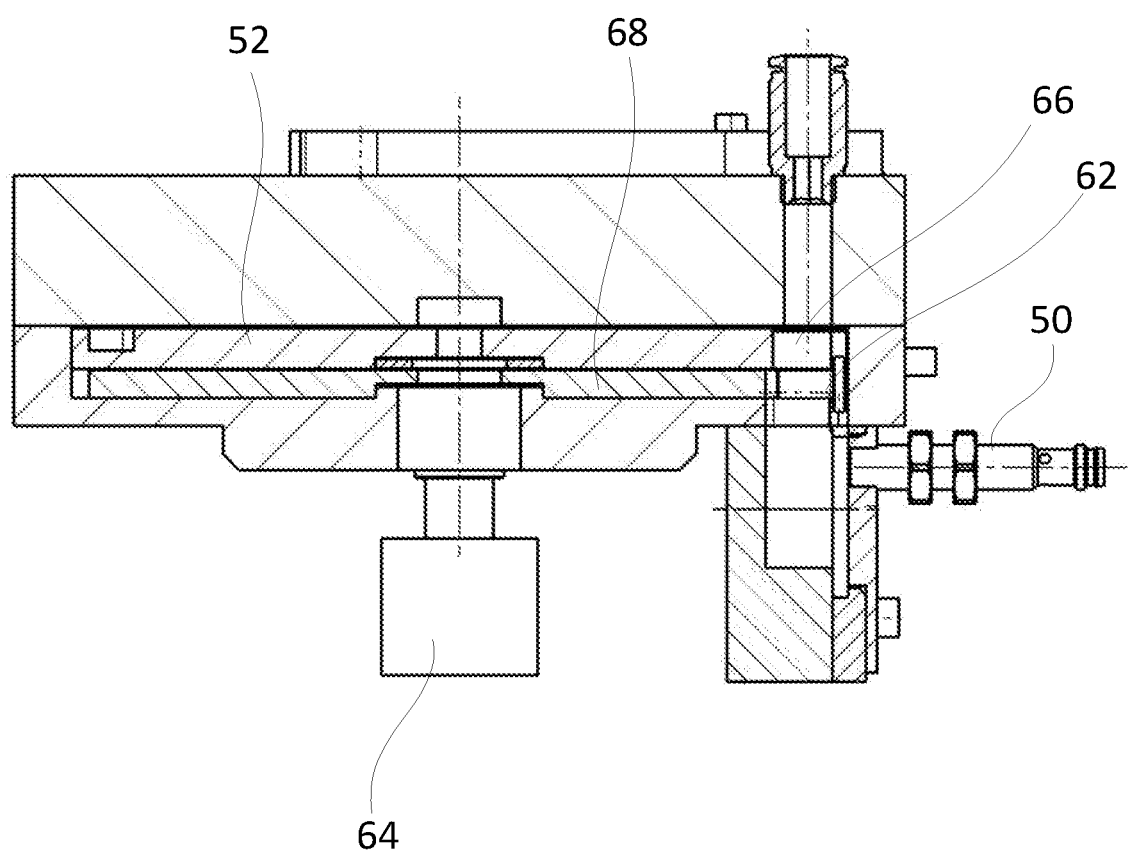

Additional advantages, features and possible applications of this invention may be gathered from the following description in which reference is made to the embodiments illustrated in the drawings. In the drawings, FIG. 1 is a perspective view of a first embodiment of a switch arrangement according to the invention, FIG. 2a is a perspective view of a first embodiment of an inventive switch arrangement, in a receiving position thereof, FIG. 2b is a perspective view of a first embodiment of an inventive switch arrangement, in an output position thereof, FIG. 3 is a perspective view of another embodiment of an inventive switch arrangement, FIG. 4 is a perspective partial view of the inventive switch arrangement of FIG. 3, in which the cover of the switch has been removed to expose the rotor element of the switch, and FIG. 5 is a cross-sectional view of the inventive switch arrangement of FIG. 3.

FIG. 1 is a perspective view of a first embodiment of an inventive switch arrangement 10, comprising a switch 14 having six supply points 12a-12f. At the end of the embodiment shown, the switch arrangement 10 further comprises three supply lines 16a,b,c, which are formed in the form of T tubes and open into the supply point 12a, 12b, 12c. The three supply lines 16a,b,c can be used to supply fourteen different joining elements to the switch. The switch further comprises a rotor element 18 connected to a rotary drive (not shown) and of approximately circular sector shape, said rotor element 18 being connected to the rotary drive at approximately the circle center so as to enable the rotor element 18 to swivel about this axis. In its circumferential area, the rotor element has 18 receiving compartments 20a to 20f, which are each assigned to a supply position 12a-12f. The compartments 20a to 20f are T-shaped to accommodate joining elements with a shaft and a head in a position-oriented manner. By rotating the rotor element 18, a joining element 12a,b,c, received at the respective supply position can be transported to an output point 22.

The output point 22 is coupled to an output line 24 which is used to forward an output joining element for further processing.

Furthermore, the switch 14 includes a receiving position stop pin 26 which limits rotation of the rotor element 18 in the direction of the supply point 12, so that the receiving compartments 20a to 20f are precisely aligned vertically with the supply points 12a-12f. This will ensure that the joining elements are received in the receiving compartments without any friction. Because rotation of the rotor element is limited by the receiving position stop pin 26, there is no need for precise control, and higher frequencies can thus be achieved since the rotor can be reliably moved to the receiving position.

In the output position, an output position stop pin 28 is provided which is selected such that by the time the rotor element reaches the output position stop pin 28, all receiving compartments 20a to 20f have passed the output point 22.

In the present embodiment, once a joining element passes the output point 22, it will fall into an output line 24 under the force of gravity.

FIGS. 2a to 2b illustrate in more detail how a joining element is conveyed from its receiving position to its output position. FIG. 2a, for example, is a view of a processing state in which a joining element 30 is supplied to the switch 14 via supply line 12a. In this state, the rotor element 18 is in its receiving position where it abuts on the receiving position stop bolt 26 in its receiving position. The element supplied via supply line 12a can thus be transferred directly into the assigned receiving compartment 20a. This is a simple way of selectively supplying a joining element 30 to the switch 14 and quickly transferring it to the output line 24.

FIG. 2b is a view of the state following rotation of the rotor element 18, with the rotor element 18 now in its output position where it abuts on the output position stop bolt. In this position, the rotor element 18 and its receiving compartment 20a have just passed the output point, and/or the receiving compartment 20a is precisely at the output position where it transfers the joining element 30 to the output line 24. In the present case, this is done in a similar manner as with an inventive switch of the type illustrated in more detail in FIGS. 3 to 5. Once the output of a joining element 30 has been detected here, the rotor element 18 is rotated back to the receiving position, where it is again available for receiving another joining element 30.

FIG. 3 is a perspective view of yet another embodiment of an inventive switch arrangement 40 comprising a switch 42 having six supply points 44a to 44f each connected to an associated supply line 46a to 46f. A manifold 48 is connected to the output point 66, said manifold 48 being used to transfer each output joining element to another supply line. A sensor 50 is integrated in the manifold 48, which sensor is adapted to detect a joining element as it passes it. The sensor 50 is adapted to transmit the detection signal to a control unit that then causes the rotor element to be returned to its receiving position.

FIG. 4 is a view of the switch 42 in which the cover of the switch 42 has been removed to expose the rotor element 52. The rotor element 52 takes the form of a disc and has six receiving compartments 56a to 56f, which are in the form of T-shaped openings. FIG. 4 is a view of the rotor element 52 in its receiving position, in which position the rotor element 52 is moved against a stop pin 58. The stop pin 58 is guided in a slot 60 provided in the rotor element 52 and, in its receiving position, runs towards one end of slot 60. On the other side, the output position is also delimited by the other end of slot 60 which runs against the stop pin 58. A control unit can be used to cause a joining element to be supplied into one of the receiving compartments 56a-56f. The joining element 62 received therein can then be conveyed to the output point by rotation of the rotor element 52, at which output point 66 the joining element 62 is then output.

FIG. 5 is a sectional view of a switch 42 through the output point. The rotor element 52 is driven by a swivel drive 64 and conveys a joining element 62 to the output position. From the receiving point to the output point, the joining element 62 is conveyed on a rolling surface 68. The rolling surface 68, which is clearly depicted in FIG. 5, has an aperture at the output position, which causes the element 62 to fall downwards under the effect of gravity and run along it. In doing so, it passes sensor 50 which detects that the joining element has been output finally. The rotor element 52 can thus be rotated back to its receiving position, and another joining element can supplied to a receiving compartment.

The invention claimed is:

1. A switch arrangement for the selection of joining elements, which comprises a switch that has at least three supply points in which joining elements can be supplied to the switch in a position-oriented manner, with an output point being furthermore provided, at which joining elements can be output in a position-oriented manner, wherein the switch comprises a conveying element having at least three receiving compartments, in each of which a supplied joining element can be received at a respective supply point, and the conveying element can convey the joining elements from a receiving position to an output position and from the supply points to the output point, which is fixed relative to the supply points, and output them there;
- wherein said receiving compartments take the form of openings which extend radially in the conveying element, with the result that the joining elements are conveyed at least partially resting on a rolling surface located under the conveying element in the region of the openings;
- wherein said switch has a stop for the conveying element or for a conveyor drive in the receiving position and/or in the output position.

2. The switch arrangement according to claim 1, wherein the conveying element is designed as a rotor element which can be rotated at least between certain areas.

3. The switch arrangement according to claim 1, wherein the conveyor drive is connected to the conveying element.

4. The switch arrangement according to claim 3, wherein said conveyor drive is designed as an electromechanical drive or pneumatic actuating drive.

5. The switch arrangement according to claim 1, wherein the switch arrangement is synchronized to ensure that only one joining element at a time is output in a defined manner.

6. The switch arrangement according to claim 1, wherein said receiving compartments are T-shaped.

7. The switch arrangement according to claim 1, wherein said receiving compartments are assigned to a respective supply point and are adapted in shape to the joining element conveyed there.

8. The switch arrangement according to claim 1, wherein said stop is formed in that a bolt is guided in, and interacts with, a slot made in the conveying element.

9. The switch arrangement according to claim 1, wherein the conveying element is designed as a rotor element taking the form of a disc or of a plate comprising a circular sector.

10. The switch arrangement according to claim 9, wherein the conveying element takes the form of a circular sector, and that at least one stop element is provided that acts directly against the rotor element in both directions of rotation.

11. The switch arrangement according to claim 1, wherein a manifold is provided downstream of the output point and through which output joining elements are guided.

12. The switch arrangement according to claim 1, wherein said switch has a compressed air connection which is used to forward an output joining element for further processing.

13. The switch arrangement according to claim 12, wherein said compressed air connection is located in a manifold.

\* \* \* \* \*